United States Patent [19]

Rosenfeld

[11] Patent Number: 4,704,989
[45] Date of Patent: Nov. 10, 1987

[54] CAT BOX LITTER AND PROCESS FOR PRODUCING SAME

[76] Inventor: John Rosenfeld, 500 Keele Street, Toronto, Ontario, Canada, M6N 3C9

[21] Appl. No.: 814,622

[22] Filed: Dec. 30, 1985

Related U.S. Application Data

[63] Continuation-in-part of Ser. No. 680,527, Dec. 11, 1984.

[51] Int. Cl.$^4$ .............................................. A01K 1/015
[52] U.S. Cl. ...................................................... 119/1
[58] Field of Search ........................................... 119/1

[56] References Cited

U.S. PATENT DOCUMENTS

| | | | |
|---|---|---|---|
| 4,187,803 | 2/1980 | Valenta | 119/1 |
| 4,203,388 | 5/1980 | Cortigene et al. | 119/1 |
| 4,311,115 | 1/1982 | Litzinger | 119/1 |
| 4,341,180 | 7/1982 | Cortigene et al. | 119/1 |
| 4,560,527 | 12/1985 | Harke et al. | 119/1 |

Primary Examiner—Robert P. Swiatek
Attorney, Agent, or Firm—Ostrolenk, Faber, Gerb & Soffen

[57] ABSTRACT

A process is provided herein for making absorptive pellets from clay "fines" having open pores spaces therein, the fines including clay particles that will pass through a 40–200 mesh screen. The process includes the first step of forming a mixture of clay "fines" with an aqueous solution of a binder material, e.g. a lignosol. The moistened clay-binder particles, at a moisture content of about 46% by weight, are subjected to the action of a pin-type solids conditioning and micropelletizing processor to convert the moistened clay-binder particles into partially-dried, multi-faceted, bulky aggregates, while substantially simultaneously flashing-off some of the excess moisture. This provides durable, bulky, partially-dried highly absorptive pellets having a maximum of about 25–29% by weight moisture, the durability being as tested in a manner to be described hereinafter. The pellets so formed are then preferably finally dried to a moisture content of about 5% and then may be used as cat box litter, since they are absorptive pellets having both a total surface absorption and an absorption capacity in the open pore spaces approaching the capacity of clay "fines" starting material, i.e. the surface absorption plus about 90–95% of the pore volume of the clay fines. It is also believed that the binder expands during the drying process to improve the pore volume of the pellets.

15 Claims, 1 Drawing Figure

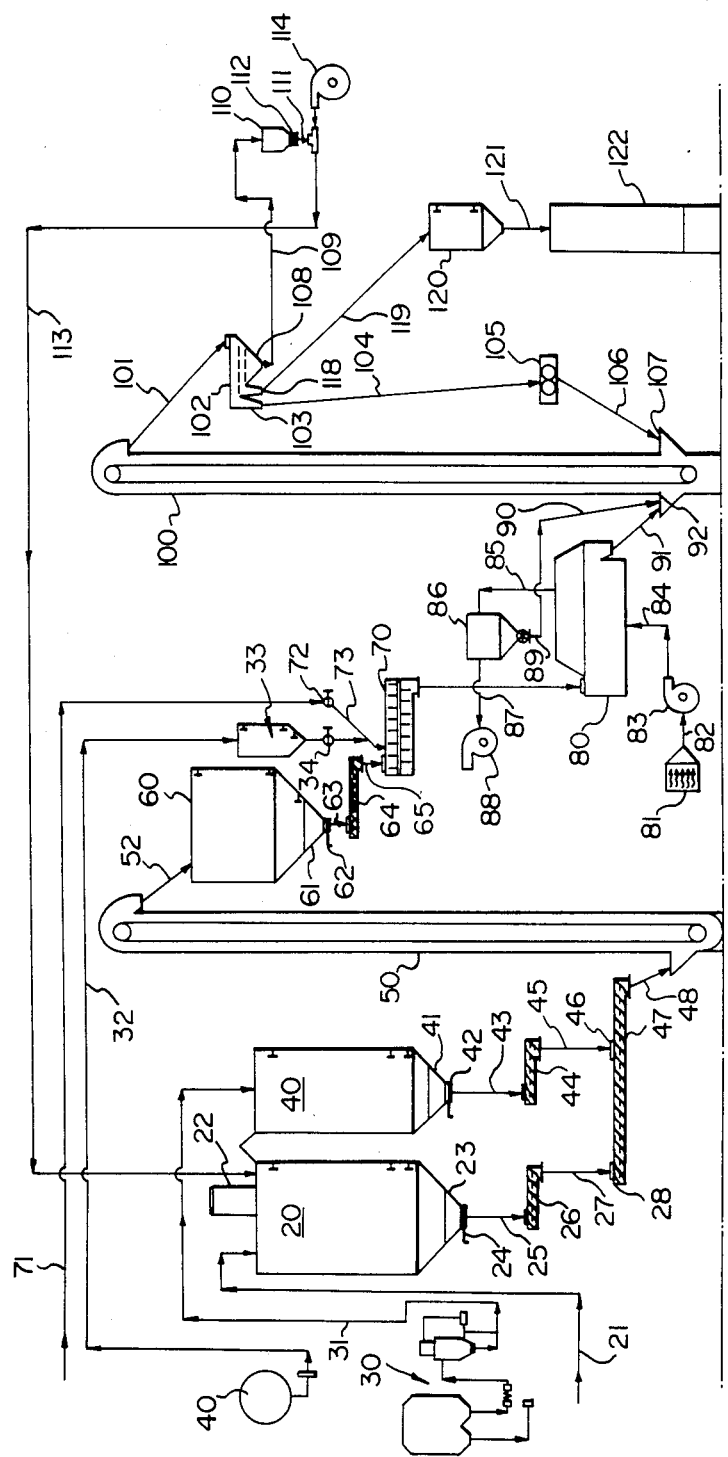

CAT BOX LITTER AND PROCESS FOR PRODUCING SAME

BACKGROUND OF THE INVENTION (i) Related Inventions

This application is a continuation-in-part of application Ser. No. 680.527 filed Dec. 11, 1984.

(ii) Field of the Invention

The present invention relates to the production of absorbent pellets from highly absorptive solids materials, namely "fines" i.e. particles of a size of about 40 to about 200 mesh, the absorbent pellets being especially useful as cat litter.

(ii) Description of the Prior Art

For the purpose of this invention, the term "highly absorptive solid material" is defined as clays. diatomateous earths, Fuller's earths, and bentonites, that are low in bulk density, usually less than about 45 lbs/cu. ft., and have the ability to absorb liquids into their pores. Such materials usually contain more than one component but most often have a high percentage of kaolinite, or attapulgite, or montmorillonite, or sepiolite, or diatomite. Generally such a material that has any of the above as the major component is very likely to have lesser amounts of one or all the others. Any of the other known clay minerals. e.g. kaolinite and illite are commonly present and non-clay minerals and/or silicious materials that cannot be classified as diatomaceous earth may be present. Typical of the latter is silica sand, limestone, iron oxide and gypsum.

Another useful clay material is Georgia clay. Georgia clay is a naturally-occuring clay material consisting predominantly of the clay mineral kaolinite, a crystalline hydrated aluminum silicate of the formula $Al_2O_3 \cdot 2SiO_2 \cdot 2H_2O$. This clay mineral is rarely found pure, but is the main constituent of kaolin whose composition is about 40% alumina, about 55% silica, plus impurities and water. Kaolin is also known as china clay; white bole; argilla; porcelain clay; white clay; and is a white-burning clay which, due to its great purity, has a high fusion point and is the most refractory of all clays.

Such materials, which are used as industrial absorbents, soil conditioners, decorative mulch herbicides, insecticide carriers, cat box absorbent and sanitary absorbents, are generally mined, dried and/or calcined, crushed and screened to a particle size, which depends on the particular use to which it will be applied. The crushing and screening inevitably leads to a waste products known as "fines", which can be defined as a range of particles less than about 40-200 mesh in size. While the "fines", from some specially selected and/or further processed such material can be used, for instance, attapulgite as drilling mud, it is generally accepted within the industry that such materials which are best suited as an absorbent or a decorative purposes and which grade down from about 40-200 mesh have little market demand. In some products, depending on the desired final particle size, "fines" can be generated in an amount equal to about 10% to about 60% of the final product to be sold, and for some products, e.g. 16/30, 30/60 and 24/84 insecticide grades, the "fines" lost will be on the high side of the above range. Obviously, if these "fines" cannot be used they represent an economic loss to the manufacturer and in fact create a disposal problem.

Various methods have been advanced for pelletizing "fines" which generally involve processing the "fines" by compressing them into pellets of a usable size. These methods have proven satisfactory for pelletizing plastic, nonabsorbent clay "fines". Processes for pelletizing absorptive mineral "fines" which use collidial clay as a binder by agglomeration have also been advanced but for the most part have been unsatisfactory because it is difficult to control the pellet size and strength and the resulting pellets are unstable under certain environment conditions and lack the qualities of the absorptive mineral.

Procedures have been proposed for treating such clays to enable the production of pastes and/or pellets therefrom. In one procedure, in U.S. Pat. No. 1,394,241, patented Oct. 18, 1921 by E. Weber, clay pastes are provided which contain, in addition to water, various vegetable extracts. Such vegetable extracts include the saponaceous bodies and extracts or matter having their origin from the disintegration of cellulose (lignin). Among the useful saponaceous substances were pure saponins, githagin, quillaja and senegin. Extracts of any saponin-bearing plants, barks, roots, bulbs, fruits, e.g. of the quillaia, of soapwort, of cock-wheed, of sow-breads, and more generally of the saponin-bearing plants as well as decoctions of ivy and of capsules of the chestnut, and neutral water soluble saponins were also said to be useful. In addition cellulose-waste and cellular pitch, alkaline waste-lyes and sulfite-cellulose may also be used.

The object of such addition was, however, not to be able to produce absorptive pellets from clay fines, but, in fact to improve the pouring of clay-pastes or unplastic stiff pulps through the use of alkali, mixed with a small percentage of those vegetable extracts.

Allen, in U.S. Pat. No. 2,765,238, patented Oct. 2, 1956, provided a reinforcing pigment produced by precipitating lignin from an aqueous solution in which there was hydrated silica or silicate, or a mixture thereof. The hydrated silica and silicate could be present either in the aqueous solution or suspended therein in very finely divided form. In the product, lignin was preferably present as a coating. The aim of that invention was, however, to provide calcium silicate pigment which could be used in rubber compounding and which would disperse well in rubber. There was no suggestion of providing absorptive pellets from clay fines.

Gmeiner, in U.S. Pat. No. 2,839,415, patented June 17, 1958, provided a procedure for the manufacture of clay products, which involved the addition of waste sulfite liquor, which had been previously concentrated, to the natural clay and/or shale body. Waste sulfite liquor is the liquor which results from the treatment of wood in making pulp by the sulfite process, wherein the cellulose fibers are liberated from the wood by the employment of an aqueous solution of sulfurous acid in which a calcium, magnesium or ammonia base has been dissolved. The waste sulfite liquor thus obtained contains the soluble products of digestion, which amount to 50 percent or more of the original wood substance. Although the exact composition of the waste liquor is not completely known it is believed to include lignin, carbohydrates, proteins, resin, fat, sulfur dioxide combined with lignin, and the calcium salt of lignosulfonic acid for the magnesium or ammonia salt, if either of the latter are used as a base for the sulfurous acid used in the digestor. It also contains lignin sulfurous acid used in the digestor, and lignin sulfonates, i.e. metallic sulfonate salts made from the liquor of sulfur pulp mill liquors. The patentee was concerned with the problem of improving the strength, both in the unfired and fired state of clay products, and, therefore, reduce the loss in manufacturing and handling. That patentee was not concerned with the provision of absorptive pellets from clay fines.

Herdrich, in U.S. Pat. No. 3,536,503, patented Oct. 27, 1970, provided a bloated clay by adding a solution of additives to the clay which, during the driping process were capable of forming a solidified shell around the granule. The additives acted as binders and were set or cured at low temperatures below about 300° C., preferably just above about 100° C. One suitable solution suggested was sulfite waste liquor, which had the advantage of being economic and available in large amounts. Powdered fluxing agents and gasifiable bloating adjuvants were also added in suspension or emulsion. This patentee thus intended to provide a combination of additives which allowed converting almost any plastic clay to a bloating clay of desired low bulk density and low water absorbency. He was not concerned with the provision of absorption pellets from clay fines.

Parmella, in Canadian Pat. No. 641.299, issued May 15, 1962, provided a process for the production of pellets from particulate solid materials which comprised forcing the particulate material through a cylindrical die of such proportions that the ratio of the diameter to the length in the range of 1:5 to 1:15, the die having been previously conditioned by forcing therethrough particulate material comprising a lubricant. The patentee was thus concerned with a pelletizing of powdered material to produce pellets which had good mechanical strength. He was not concerned with the provision of absorptive pellets from clay fines.

Valenta, in U.S. Pat. No. 4,036,928, patented July 19, 1977 addressed the problem of pelletizing absorptive clay fines for use as, e.g. animal litter. According to that patentee, "fines" of an absorptive mineral, e.g., fuller's earth or diatomaceous earth, were mixed with sufficient moisture to just fill the pore space in the particles. In one instance water was added in an amount equal to between about 30 to about 45 percent by weight to the "fines". Once the "fines" and moisture were mixed in a cement-type mixer, ribbon blender or other suitable mixing device, they were then placed in a pelletizing machine where the moistened "fines" were compactly formed into pellets by forcing the mixture through a die. After the pellets were formed they were cut to the desired size. The pellets were then dried, driving the water from the pore space, with the result that the pellets were said to have substantially the same absorbent capacity and bulk density as the original material.

Animal litter had also been made from waste rejects from a secondary fiber plant. In U.S. Pat. No. 4,341,180, patented July 27, 1982 by L. R. Cortigene et al, an animal litter was provided by the steps of partially de-watering waste rejects from a secondary fiber plant to a consistency such that the partially de-watered waste contained from 32 percent to 40 percent water. The animal litter so prepared comprised pelleted and dried rejects of a secondary fiber plant containing a deodorizer material produced by de-watering rejects of a secondary fiber plant, cutting the rejects into small pieces, incorporating therewith a deodorant material, pelletizing and drying. The deodorant material was sodium bicarbonate. The sodium bicarbonate could be partially or totally replaced by other suitable deodorants, for example, chlorophyll, sodium dihydrogen phospate, potassium dihydrogen phosphate, potassium acid phthalate, the water soluble constituents of cherry pits, 2-isopropoxycamphane, 2-($\beta$-hydroxyethoxy) camphane, and the like. Additionally, other bactericides e.g. cetylpyridinium chloride, cetylalkonium chloride, and the like, could be included which functioned both as bactericides and as surfactants. Antioxidants, and mold inhibitors, e.g. propionic acid and its salts, and phenols and phenolic salts, e.g. sodium pentachlorophenol could also be included. Pigments and dyes could also be included, most advantageously, in the slurry fed to the vacuum filter, for example, along with a flocculating agent added to improve the filteration.

The animal litter composition of that invention was prepared from rejects of a secondary fibre plant. The solids in these rejects contained cellulose and paper-making mineral filler which was chiefly kaolin or china clay. These rejects were de-watered, cut into pieces, mixed with the deodorant or other additives, pelletized and dried, to give a pelleted and dried material containing, cellulose mineral filler, and a deodorizing material.

Applicant, in copending application Ser. No. 680,527 filed Dec. 11, 1984, of which the present application is a continuation-in-part provided a commercially useful process for pelletizing "fines" of absorptive minerals into absorptive pellets of useful size that retain substantially the same absorbent capacity and bulk density as the original material. That invention was predicated on the fact that the clay "fines" were mixed and blended with an adhesive-type soluble lignin, and that the clay-lignin mixture was then extruded through a particular type of pellet mill operated under such condition of pressure and shear that the moisture was flashed off in-situ to a moisture content in the pelleted material of down to about 5% or less but usually in the range of about 25%–29% or less and still being absorptive. That invention therefore provided a process for making pellets from clay "fines" having open pore spaces therein, the fines including mineral parricles that will pass through a 40–200 mesh screen, the process comprising: (a) mixing the clay "fines" in a mixing appartus with an aqueous solution of lignin; (b) transferring the moistened clay-lignin particles from the mixing apparatus to a drum-ring-type pelletizing apparatus having a die and cutting means therewith; and (c) forcing the moistened clay-lignin particles through the die compactly to form the clay-lignin into a coherent mass of material and cutting the coherent mass from the die to form that material into pellets, the forcing being under selected conditions of shear to flash-off excess moisture to provide pellets having a maximum of about 28% and a minimum of about 5% by weight moisture. While the above described process was useful in that the pellets so formed had an absorptive capacity in the open pore spaces approaching the capacity of the clay "fines" starting material, a problem arose in providing this process as an optimum commercial process. It was found that when the drum-ring type pelletizer was operated under such condition of pressure and shear to result in the in-situ drying, excessive wear occurred. This resulted in such high maintenance costs that the commercial operation was less than optimum.

SUMMARY OF THE INVENTION (i) Aims of the Invention

It is therefore a broad object of this invention to provide a commercially useful process for pelletizing clay "fines" to form absorptive pellets of useful size.

It is another object of this invention to provide a commercially useful process for pelletizing clay "fines" into absorptive pellets of useful strength.

It is yet another object of this invention to provide a process for pelletizing clay "fines" by compactly forming the clay "fines" into improved absorptive pellets having the desired stability under most environmental conditions.

It is still another object of this invention to provide a commercially-useful process for pelletizing "fines" of absorptive minerals into absorptive pellets of useful size that retain substantially the same absorbent capacity and bulk density as the original material, but yet have improved surface and pore absorption and pellet durability.

(ii) Statement of Invention

The present invention is predicated on the fact that the clay "fines" are mixed and blended with an adhesive-type binder, e.g. a water-soluble lignin, and that the clay-binder mixture is then converted into pellets through the action of a pin-type solids processor, which substantially simultaneously compacts the moist clay-binder mixture and flashes-off some of the excess moisture to a moisture content in a partially-dried pelleted material of about 25–29%.

This invention thus provides a process for making pellets from clay "fines" having open pore spaces therein, the fines including mineral particles that will pass through a 40–200 mesh screen, the process comprising: (a) forming a mixture of the clay "fines" in a mixing apparatus with an aqueous solution of an adhesive-type binder, e.g. a lignosulfate; (b) subjecting the moistened clay-binder particles, having a moisture content of about 46% to the action of a pin-type solids conditioning and micropelletizing processor, thereby converting the moistened clay-binder particles into partially-dried, multifaceted, bulky aggregates, while substantially simultaneously flashing-off some of the excess moisture to provide partially-dried durable, bulky, highly-absorptive pellets having a maximum of about 25%–29% by weight moisture, followed by the preferred optional step of drying the pellets to a moisture content of about 5% by weight or less. The pellets formed by the above-described process have both a surface absorption and an internal pore absorption approaching the capacity of the clay "fines" starting material, but yet have improved pellet durability.

This invention also provides absorbent pellets comprising an extruded, partially-dried in-situ mixture of clay "fines" and an adhesive-type binder.

This invention also provides a continuous method for the preparation of absorbent pellets comprising:(1) continuously transferring clay "fines" to a bulk storage area; (2) continuously transferring clay "fines" from the bulk storage area to a pin-type solids processor pelletizing apparatus; (3) continuously transferring an aqueous solution of an adhesive-type binder, e.g. a lignosulfate, to that pin-type solids processor pelletizing apparatus; (4) continuously forming a moistened mixture of clay-binder particles having a moisture content approaching about 46% by weight; (5) continuously converting those moistened clay/binder particles into partially-dried, multi-faceted, bulky aggregates by the action of the low-speed rotor shaft-and-pin assembly in the pin-type solids conditioning and micropelletizing processor, while substantially simultaneously flashing-off some of the excess moisture to provide partially-dried durable, bulky, highly absorptive pellets having a maximum of about 25%–29% by weight moisture, and then preferably drying those pellets to a moisture content of about 5% by weight, the durability being as tested in a manner described herein.

(iii) Other Features of the Invention

Other features of the process embodiment of this invention include the following:

(a) the adhesive-type binder can be lignin, or lignosol, or lignosulfate or mixtures thereof;

(b) the adhesive-type binder, e.g. lignosulfate is provided in the range of about 5–17% by weight, desirably about 8–14% by weight, and especially about 11.25% by weight based upon the weight of the "fines";

(c) the process may involve including up to about 10% by weight of a brightener, e.g. calcium carbonate;

(d) the pellets are to be used as a cat box absorbent (kitty litter), and calcined clay "fines" are used, the clay "fines" having open pore spaces therein, and including particles of a size of about 5–30 mesh;

(e) a deodorizer and/or bactericide and/or an antioxidant and/or a mold inhibitor may be mixed with the clay-binder compositon prior to forming the pellets, or with the pellets after they have been formed;

(f) the pellets may be formed of a range in size from approximately 1/16" to 3/16"; and (g) the clay fines may be of Georgia clay ($Al_2O_3.2SiO_2.2H_2O$).

Other features of the composition embodiment of this invention include the following:

(h) the clay fines may be of a size of about 5–30 mesh;

(i) the amount of the adheslve-type binder, e.g. lignin, lignosol or lignosulfate, or mixtures thereof, may be about 5–17% by weight, desirably about 8–14% by weight, and especially about 11.25% by weight based on the weight of clay "fines";

(j) the composition may include up to about 10% by weight of a brightener e.g. calcium carbonate;

(k) the clay may be Georgia clay ($Al_2O_3.2SiO_2.2H_2O$); and (l) the pellets are to be used as a cat box absorbent ("kitty litter"), and would include a deodorizer and/or a bactericide and/or an antioxidant and/or a mold inhibitor incorporated therewith.

(iv) Generalized Description of the Invention

In order to stabilize the pellets, and to reduce breakage to a minimum, an adhesive-type, lignin-type binder must be used. Thus, an aqueous solution of lignin or lignosol or lignosulfate may be used.

There are several commercial types of adhesive-type, lignin-type binders, e.g. liqnin, lignosol, or lignosulfate which may be used in the practice of this invention, although their application may vary according to differences in their alkalinity, etc. The adhesive-type, lignin-type binder which preferably should be used is a purified sodium salt containing lignin and sulfate ions which is soluble in water and in alkali. The term "lignin" or lignosol or lignosulfate as used herein generally includes various forms of the substance or mixture of substances which are part of that fraction of woody tissue known as lignin. Lignin is the major noncarbohydrate constituent of wood and woody plants, comprising about one fourth of may such materials. Lignin functions as a natural plastic binder for the cellulose fibers. The chemical composition of lignin has been given as $(C_{10}H_{13}O_3)_x$ but this is undoubtedly oversimplified. Lignin is now thought to be a three-dimensional polymer of coniferyl alcohol, $C_6H_3(OH)(OCH_3)CH:CHCH_2OH$ or other guaiacylpropane derivatives. Lignin is removed from wood by both the sulfate and soda paper pulp processes, and limited amounts have been recovered from these sources and other wood waste.

The amount of the adhesive-type, lignin-type binder as described above used in the absorbent clay pellets of this invention may vary over wide limits. Amounts which have been found to be suitable are from about 5 to 17% by weight, desirably about 8 to 14% by weight and especially about 11.25% by weight, based on the weight of clay "fines".

The clay "fines" useful in the present invention are any of the aluminum silcate materials, which are plastic when wet. Typical minerals comprising the major proportion of the useful clay "fines" are the following:

bentonite, (a mixture of several clays of which montmorillonite is the chief mineral);
kaolinite, $Al_2O_3.2SiO_2.2H_2O$;
hallosite, $Al_2O_3.3SiO_2.2H_2O$;
montmorillonite, $(Mg.Ca)O.Al_2O_35SiO_2O$;
illite, $K_2O$, $MgO$, $Al_2O_3$, $SiO_2$, $H_2O$; and
Georgia clay, $Al_2O_3.2SiO_2.2H_2O$.

In addition to the clay "fines" it may also be desirable to add a finely divided whitening agent. One example of a suitable whitening agent is calcium carborate, which may be used in a maximum amount of about 10% based on the weight of clay "fines".

In general terms, then for each 100 lbs of Georgia clay fines which should be used alone, it is possible to add up to 10 lbs of finely divided calcium carborate and then the solid mixture may be discharged together with water and the adhesive type, lignin-type binder solution to a special mixer and pelletizer, namely a variable speed drive pin pelletizer. In the pin pelletizer, a sufficient amount of an aqueous solution of the adhesive-type lignin-type binder as described above, namely about 22.5 lbs. of an aqueous solution containing about 50% by weight solids e.g. lignosol, is continuously mixed, and blended, with about 22.5 lbs water and about 100 lbs of Georgia clay fines or about 100 lbs of the mixture of Georgia clay "fines" and up to about 10% by weight of finely divided calcium carbonate of a size of 40-200 mesh, to provide a semi-slurry having almost 46% water by weight. The pellets discharged from the pin-type pelletizer generally have a moisture content of about 25-30%. It is preferred that the pellets be further dried to a moisture content of about 5% preferably by means of a fluidize bed dryer. The pellets are then screened to provide pellets of a size of e.g. about 5-30 mesh and the pellets are then bagged.

In carrying out the method of aspects of the present invention, one of the most important features is the mixing of the aqueous solution of the adhesive-type lignin-type binder with the particles of the clay, which can be either raw or calcined, or which may be mixed with calcium carborate and which has particle size less than 40-200 mesh.

The amount of the aqueous solution of the adhesive-type lignin-type binder that is added depends on the absorbent capacity of the material and should preferably be enough to fill the pore space in the clay particles. It is definitely desirable to avoid forming a slurry. It has been generally found that added water in the range of nearly 46% by weight to the clay particles works satisfactorily; about 22.5% by weight appears to be the most optimum.

It is believed that the major error in prior attempts to pelletize absorptive mineral "fines" was the failure to realize that the pelletizing machine actually compressed the particles of clay fines during the forming process, thereby destroying the porosity of the particles. By adding water and the adhesive-type, lignin type binder to the "fines", the particles, when formed into pellets, are actually compacted together rather than being compressed, with the adhesive-type, lignin-type binder preserving the integrity of the original pore space. The product formed has a random open pore configuration for good absorption, both by surface absorption and by internal pores. The adhesive-type, lignin-type binder is also believed to act as a lubricant on the surface of the particles to facilitate the substantially simultaneous forming and partial drying of the pellets.

The "fines" and the aqueous solution of the adhesive-type lignin-type binders are mixed thoroughly. It is preferred that such mixture be substantially simultaneously mixed, pelleted and partially dried by means of a pin-type solids processor designed for applications requiring high energy input to materials for mixing or micro-pelletizing. A preferred such processor is a low-speed, conditioning and micro-pelletizing device that converts dust into small agglomerates through the action of a low-speed rotor shaft and pin assembly and the additon of liquids, e.g. water, binders, surfactants or oil, e.g. that known by the trade mark Mars Mineral Corporation ADVANCED PIN TYPE micro-pelletizing device, made by Mars Mineral Corporation, PA., U.S.A.

Such pin-type micropelletizer features a cylindrical, stationary shell with a length-to-diameter ratio of between two and five. Inside the shell is a shaft with radially-extending rows of pins. There is a close tolerance between the tips of the pins and the inside of the mixer shell. Shaft rotational speed, and therefore tip speed, is several hundred RPM, which is higher than the speed of traditional paddle mixers and pugmills.

The material is entered at one end of the cylinder and whipped by the pins into a fluffed pattern as it moves from the inlet, through the shell and to the bottom outlet. As a fine spray of liquor is added at the entry section and distributed through the powder, fine mixing and micro-agglomeration occur. The end result is agglomerated densified but dried micro-pellet.

After the pellets have been formed, and since, as mentioned above, are at about 25-29% by weight moisture, they should be further dried to about 5% by weight moisture, e.g. by a fluidized bed dryer. They are then screened to remove any dust which may have developed in the process and are passed either directly or indirectly to a bagging machine where they are packed for shipment.

BRIEF DESCRIPTION OF THE DRAWINGS

The accompanying drawing shows an automated plant layout for the manufacture of absorbent pellets from clay "fines".

DESCRIPTION OF PREFERRED EMBODIMENTS (i) Description of the Drawings

As seen in the drawing, clay fines e.g., bentonite fines from a mine, are fed, e.g. at a rate of about 30,000 lb/hr via infeed line 21 to a clay storage bin 20, e.g. a 8' diameter cylinder terminating in a frustrum of a cone and having about 325 ft$^3$ of bentonite storage space. Bin 20 is provided with an upper bin vent 22 in the form of a filter receiver storage. The suitable whitening agent, e.g. finely divided calcium carbonate, may, if desired, be discharged into a railcar vacuum-pressure unloading system indicated generally by reference number 30. From such system, the calcium carbonate may optionally be fed via infeed line 31 to a calcium carbonate storage bin 40, e.g. a 8' diameter cylinder terminating in a frustrum of a cone and having about 325 ft of storage space. The adhesive-type, lignin-type binder, e.g. a aqueous solution containing about 50% by weight lignosulfate, is discharged from a railcar, indicated generally at 40 via line 32 to a lignosulfate holding tank 33.

Bentonite bin 20 is provided with a bin activator 23, e.g. a 4' diameter 45° slope GBD-4 bin activator and leads, via manual slide gate 24 and line 25 to a screw feeder 26, e.g. a 12" diameter variable speed, volumetric screw feeder. Calcium carbonate bin 40 (if desired) has bin activator 41, e.g. a 4' diameter, 45° slope and GBD-4 bin activtor leads, via manual slide gate 42, and line 43 to a screw feeder 44, e.g. a 9" diameter, variable speed, volumetric screw feeder.

The discharges from screw feeder 26 via line 27, and from screw feeder 44 via line 45 enter a conveyor 47 via their respective inlet ports 28, 46, conveyor 47 preferably being a 14" diameter ribbon screw mixing conveyor. The outlet from conveyor 47 is discharged, via line 48 to the inlet port 49 of an elevator 40, e.g. an 8×5 centrifugal discharge belt elevator known by the trade mark STARCO, an elevator 13' high capable of conveying about 15 tons/hr.

The discharge from elevator 50 is fed, via line 51 to a mixed product surge bin 60, e.g. a 6' diameter cylinder terminating in a frustrum of a cone and, e.g. a 4' diameter 45° slope GBD-4 bin actuator leading, via manual slide gate 62, and line 63 to a volumetric screw feeder 64, e.g. a 12" diameter screw feeder capable of feeding about 6-9 tons/hr.

The discharge from screw feeder 64 in the form of a clay-lignosulfate moist mixture having a moisture content of 46% by weight passes, via line 65 to a pin pelletizer 70, e.g. a MARS MINERAL model 30 DROL pin pelletizer having a variable speed drive and a capacity of about 7.5 tons/hr. Pin pelletizer 70 is also fed with the aqueous solution of the lignosulfate from lignosulfate holding tank 32 via flow control valved line 34, along with any desired additional water, via water source line 71, valve 72 and inflow line 73.

The discharge from the pin pelletizer 70, e.g. pellets having a moisture content of about 25-29% by weight passes to a dryer 80, e.g. a model FBC1150, 72"×270" fluidized bed dryer to provide preferred drying of pellets to about 5% by weight moisture. Heat for drying is generated at a heat source 81, e.g. a natural gas heater, connected via line 82 to a dryer fan 83, e.g. one capable of discharging about 14,000 ft³/min which discharges via line 84 to the fluidized bed dryer 80. The excess moisture, dust and heat are vented via line 85 through a dust collector 86. The moist air is discharged through line 87 by means of exhaust air fan 88, e.g. one capable of discharging about 18,000 ft³/min. The recovered dust from the base 89 of dust collector 86 is fed via line 90 and, along with the dried pellets at e.g. about 100° F. and about 5% by weight moisture discharged from fluidized bed dryer 80 via line 91 to the inlet port 92 of an elevator 100, e.g. an 8×5 centrifugal discharge belt elevator known by the trade mark STARCO elevator, a 16' high elevator capable of discharging about 7.5 tons/hr. The discharge from elevator 100 is fed via line 101 to a two deck screen 102, to discharge 5-30 mesh pellets. The oversize is fed from outlet 103 via line 104 to crumbling device 105, e.g. a shell-type crumbling device to provide a discharge of 5 mesh pellets. The discharge from crumbling device 105 is fed, via line 106 to a second inlet port 102 of elevator 100.

The fines are removed from outlet 108 through line 109 to fines bin 110 capable of holding e.g. about 6 ft³ of fines. The fines are eventually fed via line 111 and blow-through air lock 112 and return line 113 back to bentonite bin 20. The fines are conveyed in this manner by fines blower 114.

The desired sized pellets are fed from outlet 118 via line 119 to pellet surge bin 120 from where they are discharged, via line 121 to conventional packing equipment, shown schematically as 122.

(ii) Description of Preferred Embodiments

When prepared in the manner as described above, the pellets are preferred to have the following characteristics.

| MOISTURE (%) | SURFACE AREA $M^2/g$ | PORE VOLUME c.c./g |
| --- | --- | --- |
| 3%-5% | 90-120, e.g. 99.7 | 0.20-0.30, e.g. 0.26 |

While the above characteristics are desirable a satisfactory product is obtained with variations of about ±25% i.e. a moisture of about 2-6%, a surface area of about 70-150$M^2/g$, and a pore volume of about 0.15-0.37 c.c/g The pellets produced according to the method of the present invention not only have the above characteristics of surface area and pore volume and moisture content, but also have a particular pellet durability. It is now known that hardness testers for pellet quality have in general given way to the durability testing procedure which is designed to approximate the handling that pellets receive during a normal handling situation. This testing mechanism and test program were developed at Kansas State University a number of years ago. This test involves a prescribed agitation of pellets for a predetermined time, and then measuring the % of fines generated.

The system involves using a set of screens, Tyler type, and a tumbling barrel according to the following: A.S.A.E. Standard: S269.1

PELLETS AND CRUMBLES: The durability of pellets and crumbles shall be determined by the following procedure:

DEVICE: Durability of pellets and crumbles shall be determined by tumbling the test sample for 10 mins. at R.P.H. in a dustite enclosure. The device is rotated about an axis which is perpendicular to and centered in the 12" slides. A 2"×9" plate is affixed symmetrically along one of its 9" slides to a diagonal of one 12"×12" side of the symmetrically along one of its 9" slides to a diagonal of one 12"×12" side. A door may be placed in any side and should be dustproof. Projections, e.g. rivets and screws, shall be kept to a minimum and well rounded.

SCREENS: Fines shall be determined by screening a sample on a wire sieve having openings just smaller than the nominal pellet diameter.

TEST PROCEDURE: A sample of pellets or curmbles to be tested will be sieved on the appropriate sieve to remove fines. If pellets of 1/16 in. diameter are being tested, select pellets which are between 1/16 in. in diameter and 1/16 in. to ¼ in. in length. Place a 1.102 lb. (500 gram) sample of sieved pellets or crumbles in the tumbling can device. After tumbling for 10 minutes, the sample will be removed, sieved and the percent of the whole pellets or crumbles calculated. Pellet and crumble durability will be defined as follows:

DURABILITY =

$$\frac{\text{WEIGHT OF PELLETS OR CRUMBLES AFTER TUMBLING} \times 100}{\text{WEIGHT OF PELLETS OR CRUMBLES BEFORE TUMBLING}}$$

Normally pellets will be tested immediately after cooling. When the temperature of the pellets falls within plus or minus 10 degrees F of ambient, they are considered cool. The test is to be done on a Kansas City tumbling box, as described above.

The screens are generally in the form of a downwardly sloping set of screens, fed by the incoming material to signate at overs (merge cubes and pellet scalps), mid-cut (pellets and crumb scalps), and fines (i.e. crumbles and fines).

The pellets that are formed utilizing the method of an embodiment of this invention so far described with respect of the clay "fines" are strong, uniform in shape and size, and have an absorbent capacity and bulk density that approaches that of the original clay "fines". They are generally of a size of 1/16" to 3/16" and have a pore volume which corresponds to about 90 to about 95% of the clay "fines".

One of the truly beneficial features of this invention is the versatility which is achieved. That is by varying the speed of rotation of the pin pelletizer, between about 450 to about 540 r.p.m., for instance, clay "fines" can be compactly formed into pellets of varying sizes e.g. of about 5-30 mesh, and shapes to be used as a cat box absorbent, oil and grease absorbent, decorative mulch, nesting material, soil conditioner, and sanitary absorbent, to effect the desired aesthetic properties.

For use as cat box absorbent ("kitty litter"), a commercially available deodorizer, e.g. pine oil, wintergreen, sodium bicarbonate chlorophyll, sodium dihydrogen phosphate, potassium dihydrogen phosphate, potassium acid phthalate, the water soluble constituents of cherry pits, 2-isopropoxycamphane, 2(β-hydroxyethoxy) camphane, or the like can be added to neutralize odorous spills, e.g. cat odors. Additionally, bacteriocides, e.g. cetylpyridinium chloride, cetylalkonium chloride or the like may be included, which function both as a bacteriocide and as a surfactant. Antioxidants and/or mold inhibitors, e.g. propionic acid and its salts, and phenols and phenolic salts, e.g. sodium pentachlorophenol, as well as pigments and dyes may also be included.

(iii) Example of the Invention

One example of the method of an embodiment of this invention is described hereinbelow.

Cat box absorbent a. Each 100 lbs of Georgia clay "fines" (bentonite) of 40 mesh is mixed thoroughly with a sufficient volume, e.g. about 22.5 lbs of a 50% by weight aqueous solution of a lignosulfate and with about 22.5 lbs water to provide a semi-slurry having a moisture, content of almost 46% by weight, preferably in a pin-type pelletizer and are formed into pellets in, and discharged from, that pin-type pelletizer;

b. The pellets are preferably dried to about 5% by weight moisture, preferably in a fluidized bed dryer and are then screened to remove any dust; and c. The pellets are bagged.

Summary

What has been described, therefore, is a unique process for pelletizing clay "fines" into pellets of controlled stability and of useful size that retain substanially the same absorbent capacity and bulk density as the original material.

From the foregoing description, one skilled in the art can easily ascertain the essential characteristics of this invention, and without departing from the spirit and scope thereof, can make various changes and modifications of the invention to adapt it it various usages and conditions. Consequently, such changes and modifications are properly,d equitably, and "intended" to be within the full range of equivalence of the following claims.

What I claim is:

1. A process for making absorptive pellets from clay "fines" having open pore spaces therein, said fines including particles of about 40–200 mesh, said process comprising:
   (a) forming a mixture of said clay "fines" with an aqueous solution of an adhesive-type, lignin-type binder, to provide such mixture with a moisture content of about 46% by weight; and
   (b) subjecting said mixture of moistened clay-adhesives-type, lignin-type binder particles to the action of a pin-type solids conditioning and micropelletizing processor, thereby converting said moistened clay-binder particles into partially-dried multifaceted, bulky aggregates by the action of a low-speed rotor shaft-and-pin assembly in said pin-type processor while substantially simultaneously flashing-off some of the excess moisture to provide partially-dried durable, bulky, highly absorptive pellets having a maximum of about 25–29% by weight moisture; said pellets having surface absorptive capacity as well as having an absorptive capacity in said open pore spaces approaching the capacity of said clay "fines" starting material.

2. The process of claim 1 including the final step of drying said pellets to a moisture content of about 5% by weight or less.

3. The process of claim 2 wherein said final drying step is carried out in a fluidized bed dryer.

4. The process of claim 1 wherein said mixing step takes place in said pin-type solids conditioning and micropelletizing processor.

5. The process of claim 1 wherein said binder is a lignin-type binder.

6. The process of claim 1 wherein said binder is a lignosulfate.

7. The process of claim 1 wherein said clay fines are mixed with a whitening agent.

8. The process of claim 7 wherein said whitening agent is calcium carbonate, added in a maximum amount of about 10% by weight based on the weight of clay.

9. The process of claim 1 wherein said adhesive-type, lignin-type binder is present in the amount of about 5–17% by weight based on the weight of clay "fines".

10. The process of claim 9 wherein said adhesive-type, lignin-type binder is provided in the range of about 8–14% by weight based on the weight of clay "fines".

11. The process of claim 9 wherein said adhesive type binder is provided in the amount of about 11.25% by weight based on the weight of clay "fines".

12. The process of claim 1 for the making of said pellets to be used as cat box absorbent, wherein calcined clay "fines" are used, and wherein said clay "fines" have said open pore spaces therein including particles of a size of about 40–200 mesh.

13. The process of claim 12 wherein at least one of a deodorizer, a bactericide, an antioxident or a mold inhibitor is included.

14. The process of claim 1 wherein said formed pellets are of a size of about 5–30 mesh.

15. The process of claim 1, said clay "fines" are of Georgia clay ($Al_2O_3.2SiO_2.2H_2O$).

* * * * *